United States Patent [19]
Asai

[11] Patent Number: 5,607,705
[45] Date of Patent: Mar. 4, 1997

[54] MOLD FOR MOLDING DISC SUBSTRATA

[75] Inventor: Ikuo Asai, Nagoya, Japan

[73] Assignee: Meiki Co., Ltd., Ohbu, Japan

[21] Appl. No.: 439,417

[22] Filed: May 11, 1995

[30] Foreign Application Priority Data

May 25, 1994 [JP] Japan ................................ 6-135046

[51] Int. Cl.⁶ .............................................. B29C 45/00
[52] U.S. Cl. ..................... 425/190; 264/107; 425/192 R; 425/810
[58] Field of Search ................................ 425/810, 190, 425/192 R; 264/107

[56] References Cited

U.S. PATENT DOCUMENTS 4,772,196  9/1988  Asai ........................ 425/810
4,790,738  12/1988  Shimojo et al. .......................... 425/810
5,466,145  11/1995  Takahashi ............................... 425/810

*Primary Examiner*—Tim Heitbrink
*Attorney, Agent, or Firm*—Browdy and Neimark

[57]  ABSTRACT

A mold for molding digital data discs has interchangeable stampers. An outer peripheral stamper retainer and a mirror block with a convex portion allow interchange without dismounting the mold. The outer stamper peripheral retainer has a plurality of arcuate slots connected or disconnected to a plurality of rods provided with a stationary half-mold and to a corresponding plurality of holder bushings and a mirror block with a convex portion whose diameter fits an inner diameter of the outer stamper peripheral retainer. The outer stamper peripheral retainer and the mirror block correspond in size with a disc to be molded.

3 Claims, 4 Drawing Sheets

MOLD FOR MOLDING DISC SUBSTRATA

BACKGROUND OF THE INVENTION

1. Field of the Invention

The present invention relates generally to a mold for molding disc substrata of video discs, compact discs or optical magnetic discs, and more particularly concerns a novel mold for molding the discs in which a diameter of the mold cavity is changed without exchanging the entire mold.

2. Description of Related Art

Disc substrata for compact discs, video discs, or optical magnetic discs of information memory medium (hereinafter called discs) are molded generally in such a way as to inject molten resin into a mold cavity with a stamper which is formed by contacting a movable half-mold fixed to a movable platen of an injection molding machine to a statutory half-mold fixed to a stationary platen. A stamper with numerous pits for information memory is mounted to either the movable half-mold or the stationary half-mold.

There is a standard diameter of the discs. Consequently, when molding discs of different diameters, the diameter of the mold cavity for shaping a disc should be decided in accordance with the standard. The current standard regarding the diameter of discs sets the diameter of the compact disc at 120 mm, of a small compact disc (what is called a compact disc single) at 80 mm., video discs at 200 mm and 300 mm respectively, and optical magnetic discs at 86 mm and 130 mm respectively.

Hitherto, when molding a disc having a diameter different from a diameter applied in a previous injection molding cycle, the whole of the stationary half-mold and the movable half-mold have been dismounted from the stationary platen and the movable platen respectively. It is expensive to provide a new mold for each diameter of the disc.

Also in case of exchanging the stamper (due to difference of information content but not difference of diameter of the disc), it is not necessary to exchange the whole of the mold; however, complicated work of mounting and dismounting the stamper retainer is required for exchanging the stamper, which wastes much labor and time.

In case of molding discs having a diameter different from the diameter applied in a previous injection molding cycle, or in case of molding discs having information different from the information applied in a previous injection molding cycle, both mounting and dismounting the stamper and the outer peripheral stamper retainer have been absolutely required. In the former case exchange of a mirror block with a convex portion is additionally required so as to fit a diameter of the convex portion of the mirror block to a diameter of inner periphery of the stamper retainer.

There is disclosed in the prior art U.S. Pat. No. 4,790,738 referring to exchanging of stamper, plural clamping pins for holding an outer stamper holding means. These are operated by air or hydraulic cylinders. The clamping pins are provided in both of the stationary half-mold and the movable half-mold respectively. These make the mold complicated in operation and in electric circuits and air or hydraulic circuits because of providing the cylinders to both sides of the stationary half-mold and the movable half-mold.

SUMMARY OF THE INVENTION

In light of the above-mentioned problems, it is an object of the present invention to provide a novel mold for molding of discs in which the diameter of a cavity can be modified easily in accordance with the diameter of discs to be molded, without dismounting the mold from the stationary platen and movable platen respectively, so as to save labor time in the injection molding.

Another object of the present invention is to provide an improved mold for molding discs wherein complicated electric circuits and air or hydraulic circuits of a device for holding an outer peripheral stamper retainer which is applied for the mold of which a diameter of a cavity can be modified easily in accordance with the diameter of discs to be molded, are prevented by excluding air or hydraulic cylinders in either of the movable half-mold side or the stationary half-mold side due to the modification of a mechanism.

For better understanding of the operation, objects, and advantages of the invention, reference should be had to the accompanying drawing and descriptive matter in which there is illustrated and described a preferred embodiment of the invention.

BRIEF DESCRIPTION OF THE DRAWINGS

The above and other objects and the nature and advantages of the present invention will become more apparent from the following detailed description of an embodiment[s] taken in conjunction with drawings, wherein.

DETAILED DESCRIPTION OF THE PREFERRED EMBODIMENT

This invention will be described in further detail by way of example with reference to the accompanying drawings.

Figure 1:
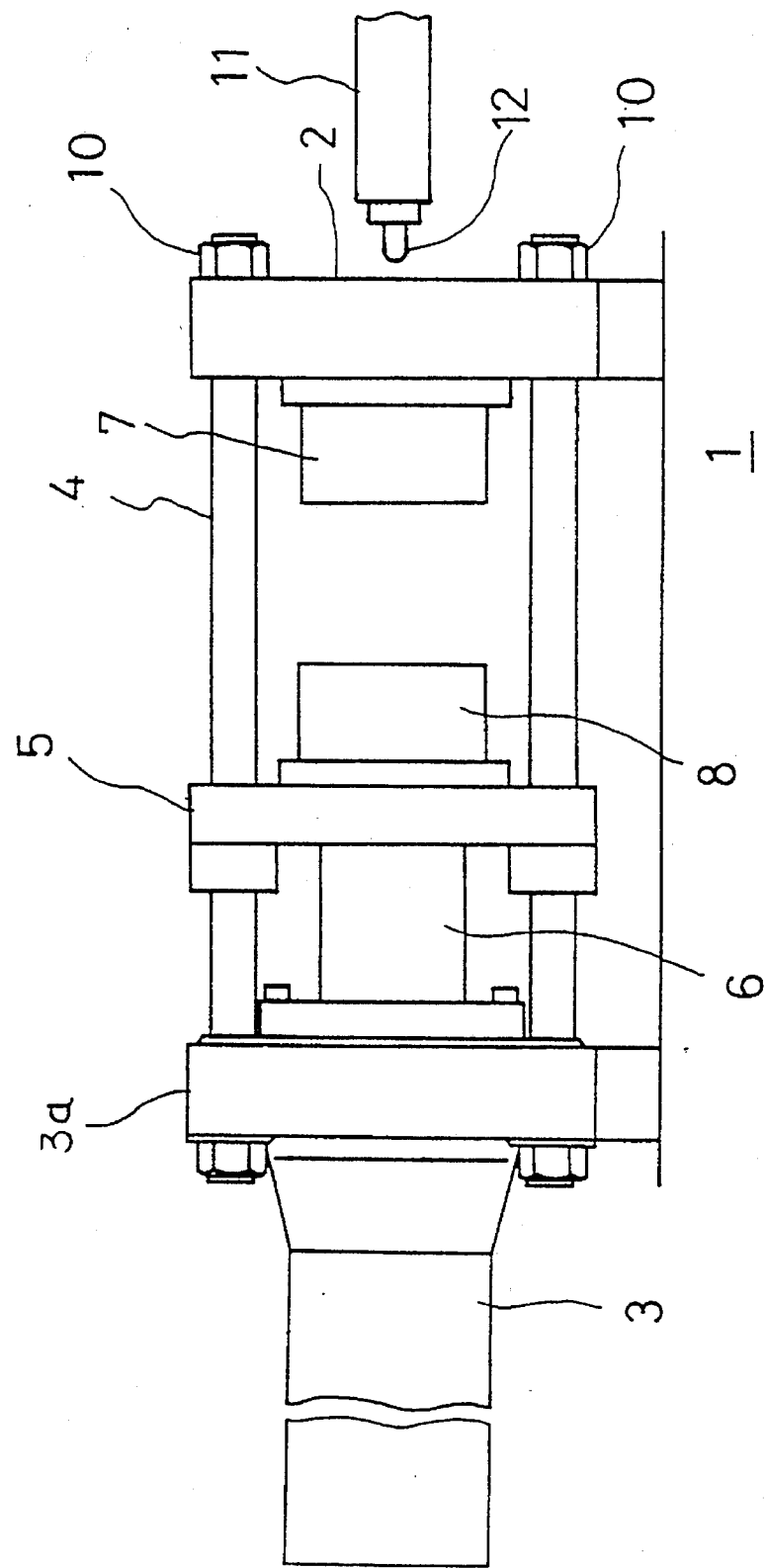
FIG. 1 shows an elevational view of a clamping unit of an injection molding machine mounting a movable half-mold and a stationary half-mold.

As shown in FIG. 1, a stationary platen 2 and a flange plate 3a of a clamping cylinder 3 are mounted fixedly on a base frame 1 of an injection molding machine, wherein a predetermined space between them is left in a straight line.

Both end portions of four tie rods 4 are connected respectively to the stationary platen 2 and the flange plate 3a with the clamping cylinder 3 by clamping nuts 10. A movable platen 5 is connected to an end portion of a ram 6 of the clamping cylinder 3 and is supported movably along the tie rods 4 so as to advance to or reverse from the stationary platen 2. A stationary half-mold 7 and a movable half-mold 8 are mounted on the stationary platen 2 and the movable platen 5 respectively. After the movable half-mold 8 mounted on the movable platen 5 advances due to actuating of the clamping cylinder 3 and has contacted the stationary half-mold 7 under clamping force, molten resin is injected from a heating barrel 11 into a mold cavity formed between the stationary half-mold 7 and the movable half-mold 8 for the discs to be molded.

In the preferred embodiment of the invention the stamper is fixed on the mirror plate provided with the stationary half-mold 7. However, the invention is not restricted to the stamper being mounted only to the stationary half-mold side.

Figure 2:
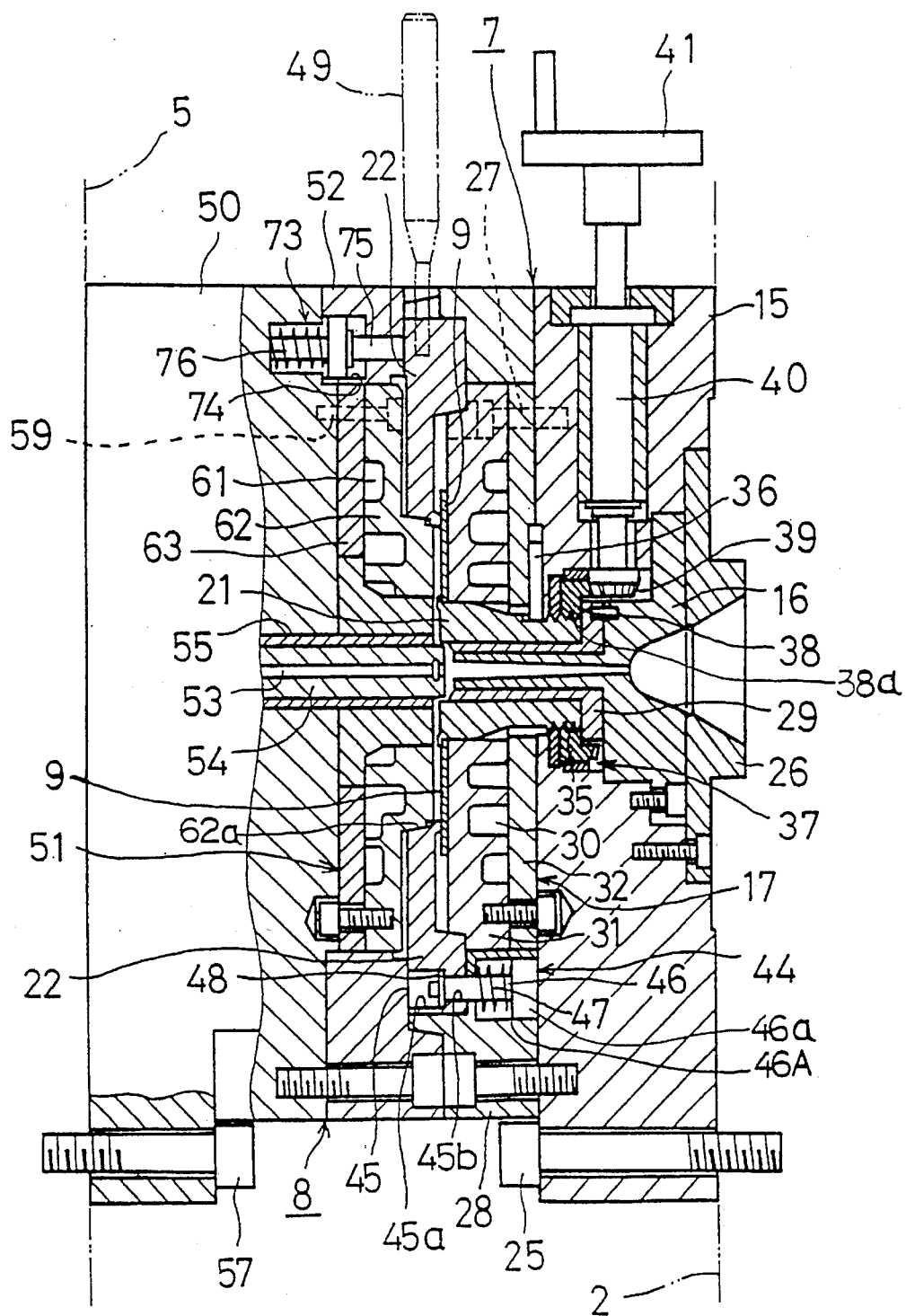
FIG. 2 shows a cross sectional view wherein the movable half-mold is in contact with the stationary half-mold for molding of a disc with small diameter.
Figure 3:
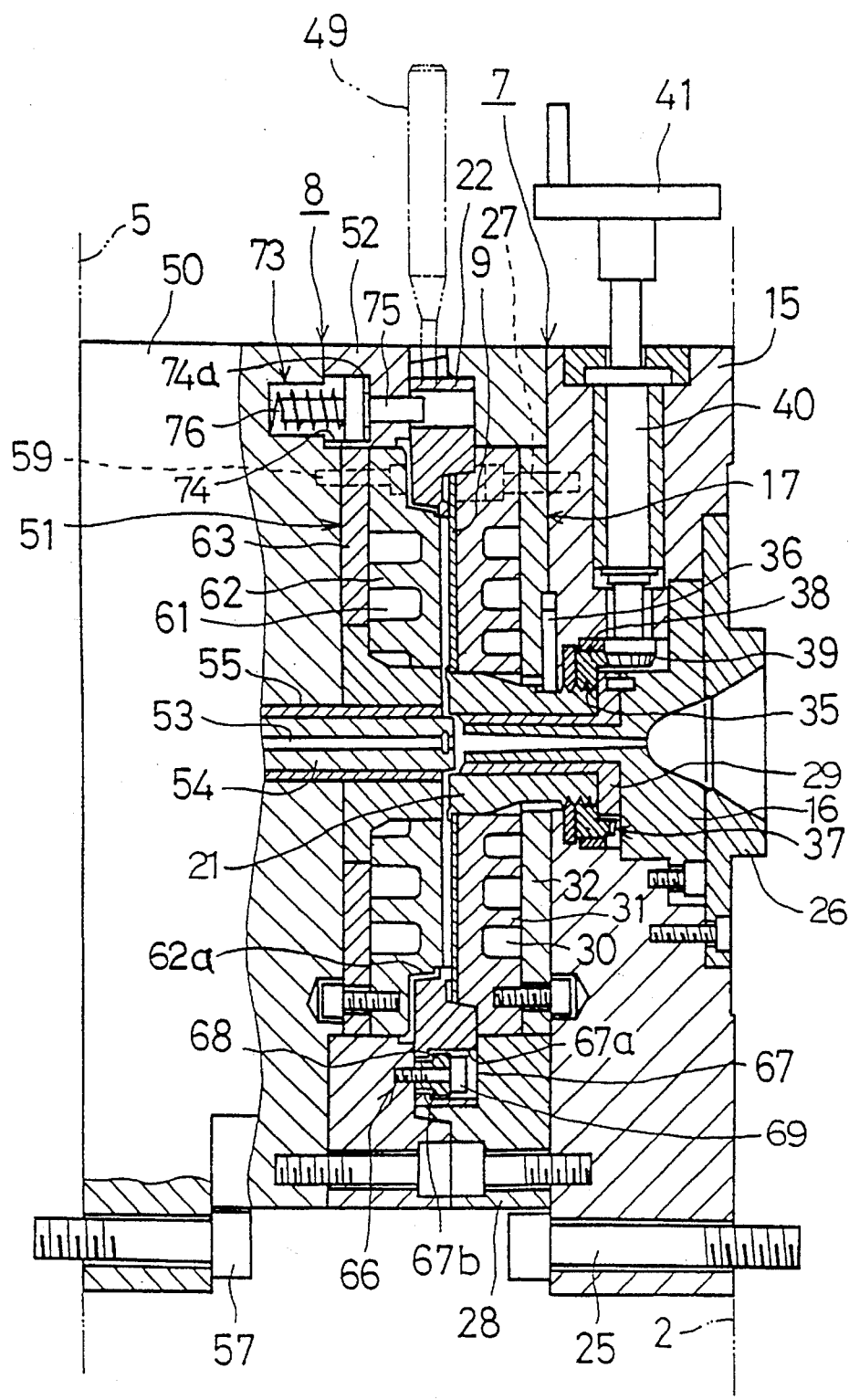
FIG. 3 shows a cross sectional view wherein the movable half-mold is in contact with the stationary half-mold for molding of a disc with a large diameter.

As shown in FIGS. 2 and 3, a base plate 15 of the stationary half-mold 7 is fixed to the stationary platen 2 by plural bolts 25 and a sprue bushing 16 is inserted fixedly in the central portion of the base plate 15. A locating ring 26, concentric to the sprue bushing 16, is provided with the base plate 15 in order to make the stationary half-mold 7 locate accurately in the center of the stationary platen 2 when mounting the stationary half-mold 7 to the stationary platen 2. A mirror block 17 is assembled tightly with a mirror plate 31 and a backcover 32 for water proofing. A channel 30 is engraved on the rear surface of the mirror plate 31 and adjusts the temperature of the mirror plate 31. Heated water, oil or vapor are available at the medium. The mirror block 17 is fixed to the surface of base plate 15 on the side of the movable platen 5 by bolts 27.

The mirror block 17 is inserted into the inner periphery of a mirror block locating ring 28 fixed to the stationary half-mold 7. A sprue sleeve 29 is fixed on the outer periphery of small diameter portion of the sprue bushing 16. An inner stamper retainer 21 is provided on the outer periphery of the sprue sleeve 29 so as to move along its axis direction.

An end portion of the inner peripheral stamper retainer 21 forms a flange portion for retaining the inner portion of the stamper 9 and another end portion of the retainer 21 has a thread portion 35. A slit for holding a key 36 is provided on the outer surface of the inner peripheral stamper retainer 21 so as to prevent turning of it.

A supporting device 37 for supporting the inner peripheral stamper retainer 21 in the stationary half-mold 7 is assembled with a bevel gear 38 having a female thread 38a in its inner periphery. A handle 41 is coupled to a pinion shaft 40 having a pinion 39 in its end portion. The bevel gear 38, of which the female thread 38a is engaged with the thread 35 of the inner peripheral stamper retainer 21, is engaged with the pinion 39. The bevel gear 38 is turned by turning of the pinion 39 due to operation of the handle 41.

The turning of the handle 41 makes the inner peripheral stamper retainer 21 stroke in the axis direction of the inner peripheral stamper retainer 21, consequently the inner peripheral stamper retainer 21 can be taken out of the stationary half-mold 7 due to turning of the handle 41.

As shown in FIG. 2, there are provided plural holder devices 44 in a mirror block locating ring 28 so as to connect an outer peripheral stamper retainer 22 to the mirror block locating ring 28. An outer periphery portion of the stamper 9 is retained in an inner peripheral portion of the outer peripheral stamper retainer 22. When the diameter of a disc to be molded is required to be changed, the outer peripheral stamper retainer 22 is replaced with one having an inner peripheral diameter corresponding with a diameter of the stamper for the disc to be molded.

Each of the holder devices 44 includes a rod 46 with a head 46a of which a rear portion is inserted movably in a respective cylinder 46A which is provided in the mirror block locating ring 28 fixed to the stationary half-mold 7. A washer 48 is provided at a front portion of the rod 46. A coil spring 47 is provided for pulling the rod 46 so that the outer peripheral stamper retainer 22 tightly retains the stamper 9.

Figure 4:
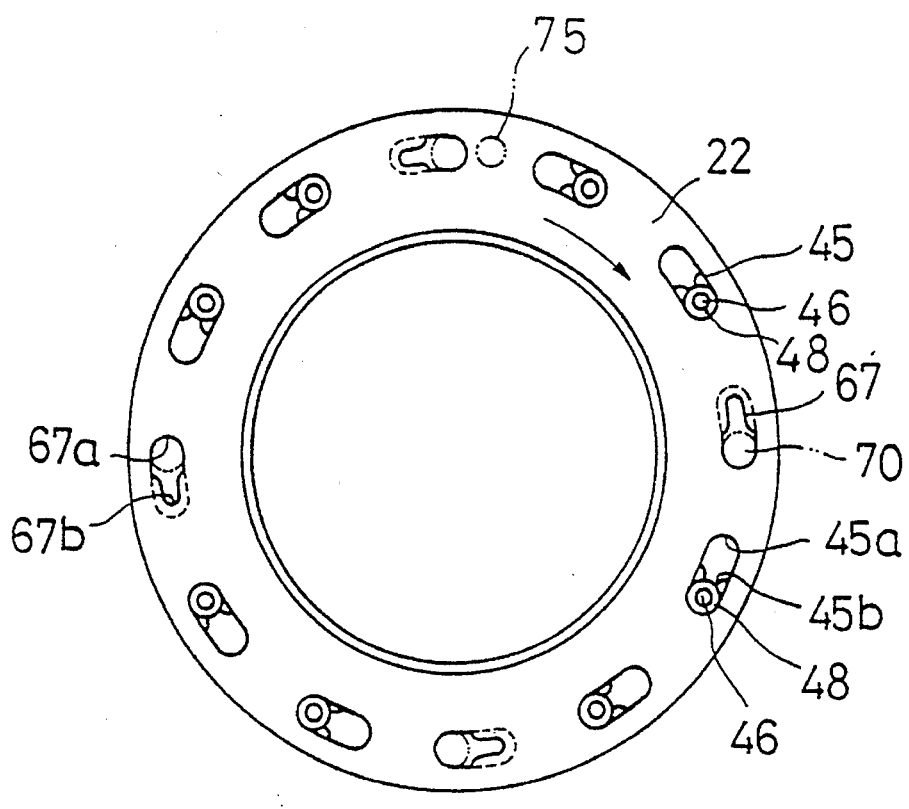
FIG. 4 is a fragmentary schematic view wherein an outer peripheral stamper retainer is retained to the stationary half-mold side.
Figure 5:
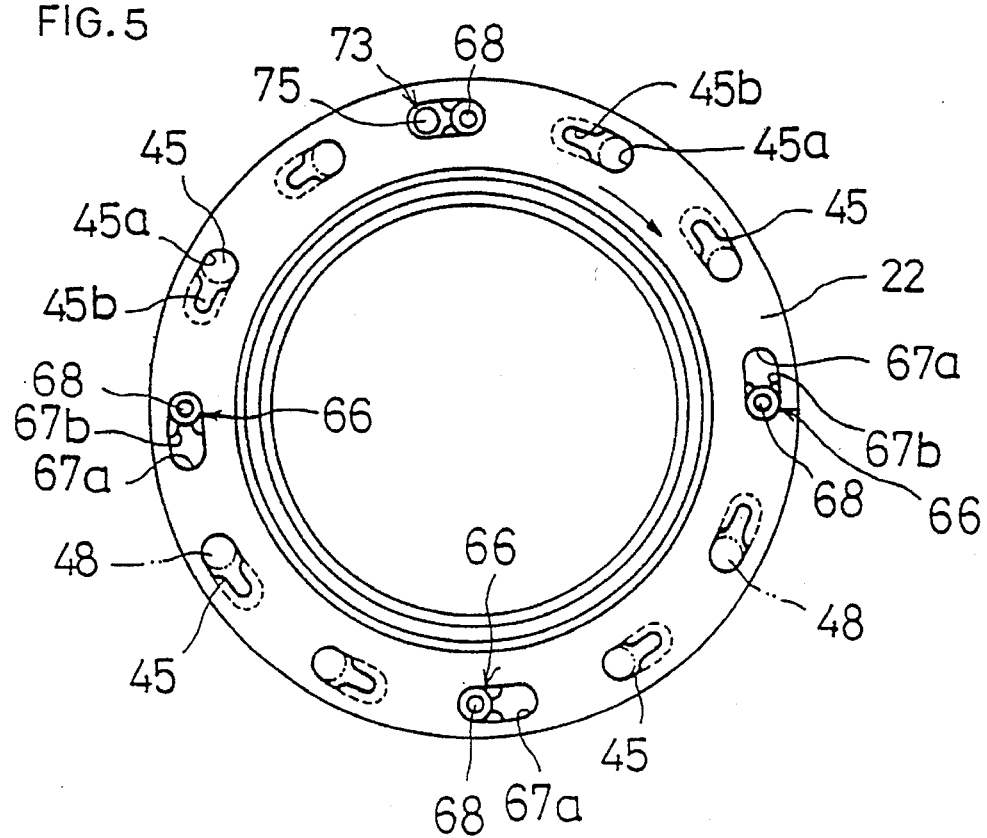
FIG. 5 is a fragmentary schematic view wherein an outer peripheral stamper retainer is retained to the movable half-mold side.

There are eight holder devices 44 in the preferred embodiment of the present invention. As shown in FIGS. 4 and 5, eight arcuate slots 45 are provided with the outer peripheral stamper retainer 22 so that the rods 46 are connected to the mirror block locating ring 28 fixed to the stationary half-mold 7 and, moreover, four arcuate slots 67 are provided with the outer peripheral stamper retainer 22 so as to be connected to the mirror block locating ring 52 fixed to the movable half-mold 8. The arcuate slots 45 are connected or disconnected to the rods 46 by turning of the outer peripheral stamper retainer 22.

Each of the arcuate slots 45 provides a wide portion 45a and narrow portion 45b. The depth of the narrow portion 45b is shallower than that of the wide portion 45a. Each arcuate slot 45 provides a step which is formed by the difference of depth between the wide portion 45a and the narrow portion 45b.

The outer peripheral stamper retainer 22 is held to the mirror block locating ring 28 by the resilient force of the springs 47 applied to the washer 48 when each rod 46 is connected to the narrow portion 45b of the arcuate slot 45. After protruding the rod 46, against the resilient force of the springs 47, by actuating of the air cylinders 46A the outer peripheral stamper retainer 22 is able to be removed from the mirror block locating ring 28 by turning lever 49 until each rod 46 is located in the wide portion 45a of the arcuate slot 45, of which width is larger than a diameter of the washer 48 of the rod 46.

As shown in FIGS. 2 and 3, a base plate 50 of the movable half-mold 8 is fixed to the movable platen 5 by plural bolts 57. A large diameter portion mirror block 51 is inserted into the inner periphery of a mirror block locating ring 52 fixed to the movable half-mold 8, which is fixed by plural volts 59. The mirror block 51 is assembled by connecting tightly, for water proofing a backcover plate 63 to a mirror plate 62. The mirror plate 62a is inserted into an inner periphery portion of the outer peripheral stamper retainer 22 on clamping the mold. A channel 61 is engraved on the rear surface of the mirror plate 62, in which medium flows for conducting heat to the mirror plate 62 so as to adjust temperature of the mirror plate 62. Heated water, oil or vapor can be used as the medium. When the diameter of a disc to be molded is to be changed, the mirror block 51 is replaced with one having a diameter of the convex portion 62a corresponding with an inner peripheral diameter of the outer peripheral stamper retainer 22 of the disc to be molded.

Plural holder devices 66 are provided in the mirror block locating ring of the movable half-mold in order to hold the outer peripheral stamper retainer 22 disconnected from the stationary half-mold 7 as shown in FIGS. 3, 4 and 5.

There are shown four holder devices 66 and four holder bushings 68 in the depicted embodiment of the invention. Each of the arcuate slots 67 provides a wide portion 67a and a narrow portion 67b respectively. Each step portion of the arcuate slots 67 is formed by the difference between depth of the wide portion 67a and depth of the narrow portion 67b, which is positioned on the side of movable mold-half 8.

Each of the holder bushings 68 of the holder devices 66, having a head portion with a large diameter and a stem with a small diameter portion, is fixed respectively by a bolt 69 to the mirror block locating ring 52. The diameter of the head portion of the busing 68 is smaller than the width of the wide portion 67a of the arcuate slot 67 and the diameter of the stem of the busing 68 is smaller than the width of the narrow portion 67b of the arcuate slot 67. Consequently, after the outer peripheral stamper retainer 22 is disconnected from the stationary half-mold 7 by actuating of the air cylinders 46A, each of the stems of the bushings 68 can be inserted into each of the narrow portions 67b of the arcuate slots 67 by turning the lever 49.

As shown in FIGS. 3, 4 and 5, a stopper device 73 is provided in the mirror block locating ring 52 of the movable half-mold side so that the outer peripheral stamper retainer 22 does not fall down due to sudden turning of it. The stopper device 73 is assembled with a cylindrical space 74 provided in the movable half-mold 8 and a stopper pin 75 which is provided movably in the cylindrical space 74 under resilient force of a coil spring 76 so as to insert it into one of the wide portions 67a of the outer peripheral stamper retainer 22. The stopper device 73 is provided in the position of the movable half-mold side where the stopper pin 75 of the stopper device 73 can be inserted into the wide portion 67a of the arcuate slot 67 of the outer peripheral stamper retainer 22.

The stopper pin 75 can be made to retract against the resilient force of the coil spring 76 by supplying fluid under pressure into a cylinder chamber 74a.

In the operation of moving the outer peripheral stamper retainer 22 from the stationary half-mold 7 to the movable half-mold 8, the movable platen 5 is advanced by actuating of the clamping cylinder 3 so as to contact slightly the movable half-mold 8 to the stationary half-mold 7. After completion of this contacting, air under pressure is supplied to the head 46a of each rods 46 which is inserted into the cylinder chambers 45A of the holder devices 44 in order to make the rods 46 retract against the resilient force of the coil springs 47 and then the outer peripheral stamper retainer 22 is turned by the lever 49 until the rod 46 is disconnected from each narrow width portion 45b and locates to the wide width portion 45a. Simultaneously, each of the stems of the bushings 68 is connected to each of the narrow portions 67b of the arcuate slots 67, so that the outer peripheral stamper retainer 22 is held on the mirror block locating ring 52 of the movable half-mold side. The stopper pin 75 is inserted into one of the wide portion 67a provided on the outer peripheral stamper retainer 22 by the resilient force of the coil spring 76 due to stopping the fluid supply into the cylinder chamber 74a. Because of preventing the sudden turning of the outer peripheral stamper retainer the outer peripheral stamper retainer 22 is not released from the movable half-mold 8 and does not fall down when opening the mold.

Exchanging of the stamper 9 and the mirror block 17 takes place as follows: after the outer peripheral stamper retainer 22 has been moved to the movable half-mold 8, the mold is opened by retracting the movable platen 5. The bevel gear 38 engaged to the pinion 39 is turned, by turning of the pinion shaft 40 due to operation of the handle 41, to release the engagement between the female thread 38a and the thread 35.

Thus the inner peripheral stamper retainer 21 is drawn from the stationary half-mold 7 and then the stamper 9 is taken out of the stationary half-mold 7.

If change of the mirror block 17 is required, it could be taken out by releasing the bolts 27. Generally, when exchanging of the stamper 9, it is not necessary to exchange the mirror block 17 for wear or damage of the mirror block surface.

After a stamper 9 with such a smaller diameter as is shown in FIG. 2 has been released, another stamper with such larger diameter as is shown in FIG. 3 is fixed on the mirror block 17 of the stationary half-mold 7 by the inner peripheral stamper retainer 21 by turning of the handle 41.

Dismounting of the outer peripheral stamper retainer 22 can be accomplished as follows: after changing of the stamper has been finished, the outer peripheral stamper retainer 22 having the inner peripheral portion of such smaller diameter as is shown in FIG. 2, which is held on the mirror block locating ring 52 of the movable half-mold 8, is released from the movable half-mold 8 by retracting of the stopper pin 75 and by releasing it from the busing 68 so as to be taken out the movable half-mold 8.

For exchanging the mirror block 51, the mirror block 51 with the convex portion 62a of such smaller diameter as is shown in FIG. 2 is dismounted from the movable half-mold 8 and then the mirror block 51 with the convex portion of such larger diameter as is shown in FIG. 3 is fixed to the movable half-mold 8 by plural bolts 59 in place of the mirror block 51 with convex portion 62a of smaller diameter.

When mounting the outer peripheral stamper retainer 22, the outer peripheral stamper retainer 22 having the inner diameter modified in accordance with the outer diameter of the convex portion of the mirror block of the movable half-mold, it is held to the mirror block locating ring 52 to connect the stem of the bushing 68 provided with the mirror block locating ring 52 to the narrow portions 67b of arcuate slots 67 provided with the outer peripheral stamper retainer 22. The convex portion 62a of mirror block 62 is inserted in the inner peripheral portion of the outer peripheral stamper retainer 22 having such a larger diameter, as shown in FIG. 3.

The movable platen 5 is advanced by actuating the clamping cylinder 3 so as to slightly contact the movable half-mold 8 to the stationary half-mold 7. Then the stopper pin 75 is retracted against the resilient force of the coil spring 76 by supplying fluid under pressure into a cylinder chamber 74a. After successively retracting the stopper pin 75 and advancing the rod 46 against the resilient force of the springs 47 by actuating of the air cylinders 46A, the outer peripheral stamper retainer 22 is turned by operating the lever 49. The outer peripheral stamper retainer 22 is then held to the mirror block locating ring 28 provided with the stationary half-mold 7 by the resilient force of the springs 47 acting through a washer 48 so that each of the rods 46 is connected to each narrow portion 45b of the arcuate slots 45.

As mentioned above, the present invention includes a novel mold in which a diameter of the mold cavity can be changed easily and quickly to match the diameter of discs to be molded, without dismounting the whole of the mold from the stationary platen and movable platen respectively.

The present invention also includes an improved mold in which the holder device for holding the outer peripheral stamper retainer avoids complicated circuits for air or hydraulic cylinder actuating of the rods.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A mold for molding disc substrata, comprising:

a stamper mounted on a stationary mirror block, the stationary mirror block being inserted within an inner periphery of a stationary mirror block locating ring mounted on a stationary half-mold;

an inner stamper retainer having a supporting device, the supporting device being inserted in a central portion of the stationary mirror block, the inner stamper retainer including means for holding an inner peripheral portion of the stamper;

a unitary outer peripheral stamper retainer, the outer peripheral stamper retainer including a plurality of arcuate slots, each of the slots including a wide width portion and a narrow width portion respectively, the plurality of arcuate slots including first arcuate slots to be connected to the stationary mirror block locating ring of the stationary half-mold and second arcuate slots to be connected to a movable mirror block locating ring of a movable half-mold;

a plurality of movable holder devices coupled with the stationary half-mold, each of the holder devices including a rod with a head, the head having a rear portion inserted movably in a fluid actuating cylinder in the stationary mirror block locating ring, a front end portion of the rod having a washer, and a coil spring for pulling the rod to connect the outer peripheral stamper retainer to the stationary half-mold;

a movable mirror block of the movable half-mold having a convex portion, the convex portion being inserted in an inner periphery of the outer peripheral stamper retainer;

a movable stopper device of the movable mirror block locating ring of the movable half-mold, the movable stopper device including a stopper pin advanced by resilient force of a coil spring and retracted by actuating of fluid cylinder to prevent sudden turning of the outer peripheral stamper retainer held in the movable half-mold;

a plurality of fixed holder devices of the movable half-mold, each of the fixed holder devices including a holder bushing, the holder bushing including a head portion having a large diameter and a stem portion having a small diameter, each of the fixed holder devices being fixed to the movable mirror block locating ring to connect the outer peripheral stamper retainer to the movable half-mold.

2. The mold according to claim 1, wherein:

the movable mirror block includes a convex portion having an outer diameter adapted to a disc diameter of the disc substrata to be molded, and the stamper has a stamper diameter greater than the outer diameter;

the outer stamper peripheral retainer includes an inner diameter generally equal to the outer diameter of the convex portion whereby the outer peripheral stamper retainer is adapted to contact the movable mirror block along the outer diameter.

3. A mold for molding disc substrata comprising:

a stamper mounted on a stationary mirror block, the stationary mirror block being inserted in an inner periphery of a stationary mirror block locating ring of a stationary half-mold;

an inner stamper retainer including a supporting device, the supporting device being inserted in a central portion of the stationary mirror block of the stationary half-mold, the inner stamper retainer including means for holding an inner peripheral portion of the stamper;

a movable half-mold having a movable mirror block with a convex portion, the convex portion having an outer diameter selected in accordance with a disc diameter;

the stamper having a stamper diameter equal to at least said outer diameter; and an outer stamper peripheral retainer disposed against said stamper and having an inner diameter selected in accordance with said outer diameter.

* * * * *